United States Patent
Verma

(10) Patent No.: US 11,601,494 B2
(45) Date of Patent: Mar. 7, 2023

(54) METHOD FOR TRANSFERRING DATA FROM A DEVICE TO A DATA MANAGEMENT MEANS, SWITCHING UNIT, DEVICE AND SYSTEM

(71) Applicant: SIEMENS AKTIENGESELLSCHAFT, Munich (DE)

(72) Inventor: Amit Verma, Taufkirchen (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/608,829

(22) PCT Filed: Apr. 13, 2018

(86) PCT No.: PCT/EP2018/059512
§ 371 (c)(1),
(2) Date: Oct. 26, 2019

(87) PCT Pub. No.: WO2018/197233
PCT Pub. Date: Nov. 1, 2018

(65) Prior Publication Data
US 2020/0195707 A1    Jun. 18, 2020

(30) Foreign Application Priority Data

Apr. 26, 2017 (EP) .................... 17168187

(51) Int. Cl.
| | |
|---|---|
| H04L 67/10 | (2022.01) |
| G05B 17/02 | (2006.01) |
| G06N 7/00 | (2006.01) |
| H04L 67/125 | (2022.01) |

(52) U.S. Cl.
CPC ............. H04L 67/10 (2013.01); G05B 17/02 (2013.01); G06N 7/00 (2013.01); H04L 67/125 (2013.01)

(58) Field of Classification Search
CPC ....... H04L 67/10; H04L 67/125; G05B 17/02; G06N 7/00
USPC ......................................... 709/201
See application file for complete search history.

(56) References Cited

U.S. PATENT DOCUMENTS

| | | | |
|---|---|---|---|
| 2006/0048155 A1 | 3/2006 | Wu et al. | |
| 2012/0022670 A1* | 1/2012 | Boe .................. | G05B 17/02 700/29 |
| 2012/0041574 A1* | 2/2012 | Hsiung .............. | G05B 19/042 700/47 |
| 2013/0104099 A1 | 4/2013 | Goeres et al. | |
| 2013/0124465 A1* | 5/2013 | Pingel ............... | G06F 3/0604 707/610 |
| 2013/0211546 A1* | 8/2013 | Lawson ............. | G05B 19/4185 700/9 |
| 2014/0257546 A1 | 9/2014 | Mizutani et al. | |
| 2014/0335480 A1* | 11/2014 | Asenjo ............... | G06Q 10/06 434/107 |
| 2016/0112283 A1* | 4/2016 | Maturana ........... | G05B 15/02 709/224 |
| 2016/0217384 A1* | 7/2016 | Leonard ............. | G06N 7/005 |
| 2016/0274978 A1* | 9/2016 | Strohmenger ..... | G06F 11/1458 |
| 2016/0330291 A1* | 11/2016 | Asenjo ............... | G06Q 30/0201 |
| 2017/0223110 A1* | 8/2017 | Lawson ............. | H04L 43/14 |
| 2020/0195707 A1 | 6/2020 | Verma | |

FOREIGN PATENT DOCUMENTS

| | | | |
|---|---|---|---|
| CN | 103002049 A | 3/2013 | |
| CN | 103135981 A | 6/2013 | |
| CN | 104683472 A | 6/2015 | |
| EP | 1870026 A1 | 12/2007 | |
| EP | 2592812 B1 * | 9/2014 | ......... G06F 11/3495 |
| EP | 2924573 A2 * | 9/2015 | ......... H04L 67/1097 |
| EP | 2517414 B1 | 3/2016 | |
| JP | 2008048382 A | 2/2008 | |
| WO | 2016097633 A1 | 6/2016 | |
| WO | 2017039010 A1 | 3/2017 | |

OTHER PUBLICATIONS

Communication of the Transmission of the International Provisional Report on Patentability for corresponding PCT/EP2018/059512 dated Jun. 6, 2019.
European Search Report for European Patent Application No. 17168187.7-1853 dated Oct. 13, 2017.
PCT International Search Report for corresponding PCT/EP2018/059512, dated May 24, 2018.
Indian Office Action for Indian Patent Application No. 201937042580 dated Feb. 25, 2021, with English translation.
Japanese Office Action for Japanese Application No. 2019-558551 dispatched May 11, 2021, with English translation.
Chinese Decision to Grant for Chinese Application No. 201880027811.7 dated Dec. 3, 2021.
Chinese Office Action for Chinese Application No. 201880027811.7 dated Jun. 3, 2021, with English translation.

(Continued)

*Primary Examiner* — Brian Whipple
(74) *Attorney, Agent, or Firm* — Lempia Summerfield Katz LLC

(57) ABSTRACT

Method for transferring data from a device to a data management means, switching unit, device and system The invention relates to a method for transferring data (16) from a device (6) to a data management means (4). In order to reduce the amount of data transferred and according to the method of the invention, using modeling data (26, 42) present in the device (6) a model (30, 44) described by the modeling data (26, 42) is determined. Using the model (30, 44), the data that is actually to be transferred to the data management means (4) is selected from a volume of data (40) provided for transfer. The device (6) transfers the selected data to the data management means (4).

10 Claims, 1 Drawing Sheet

(56) References Cited

OTHER PUBLICATIONS

Liu, Ning et al: "EPA Industrial Ethernet Data Transmission Efficiency Research"; "Electronic Technology & Software Engineering", No. 01; Jan. 10, 2016; Copyright © 2018 www.buzhibushi.com. p. 1-6 with machine translation.

* cited by examiner

METHOD FOR TRANSFERRING DATA FROM A DEVICE TO A DATA MANAGEMENT MEANS, SWITCHING UNIT, DEVICE AND SYSTEM

This application is the National Stage of International Application No. PCT/EP2018/059512, filed Apr. 13, 2018, which claims the benefit of European Patent Application No. EP 17168187.7, filed Apr. 26, 2017. The entire contents of these documents are hereby incorporated herein by reference.

BACKGROUND

The present embodiments relate to transferring data from a device to a data management means.

Nowadays, data is transferred ever more frequently from a device to a data management means (e.g., a cloud). The data management means may then store, manage, and/or analyze the data. Large volumes of data may be generated in the device, which may have to be transferred via the network to the data management means. This may lead to the network becoming overloaded and/or to the performance of the network being adversely affected. If the data is sent to the data management means by mobile radio, then high costs also arise because of the large volumes of data. It may even be that a bandwidth of the mobile radio is insufficient for the volume of data to be transferred.

In order to reduce the volume of data, the data may be compressed. However, the volume of data may only be reduced to a limited extent by the data compression.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method for transferring data from a device to a data management means, in which a volume of data to be transferred is reduced, is provided.

A method for transferring data from a device to a data management means, in which, in accordance with the present embodiments, using modeling data present in the device, a model that describes the modeling data is determined. Using the model, in accordance with the present embodiments, the data that is actually to be transferred to the data management means is selected from a volume of data provided for transfer. The device transfers the selected data to the data management means.

In the present embodiments, all data of a volume of data provided for transfer does not have to be transferred. Based on the model, the data of the volume of data that will be transferred to the data management means may be selected. In this way, the amount of data to be transferred, and thereby, for example, a volume of data transferred, may be reduced.

It would also be possible to reduce the volume of data transferred by transferring every second data value or data point of a volume of data provided for transfer. In this case, however, a characteristic of the volume of data may get lost. The definition of the model allows a sensible way of selecting the data to be transferred. In one embodiment, the characteristic of the volume of data is taken into consideration by the model in this case.

The device may be a unit that may be operated in a technical environment. The device may further include a number of units that may be operated in a technical environment, wherein each of the units is capable of functioning individually.

The data management means may be a server, for example. The data management means may further be a cloud. For example, the data management means may be an Internet of Things service. The transferred data may be stored and/or managed by the data management means. The transferred data may further be analyzed and/or presented visually by the data management means.

The cloud in such cases may have one or more servers, one or more platforms, and/or one or more applications (e.g., computer programs that run on or are capable of running on one or more platforms). The cloud may involve a Siemens cloud system known as MindSphere. In this system, the cloud is realized by one or more processing units, for example, which may make one or more services available. These services may be called through Application Programming Interfaces (APIs), for example.

The cloud may thus be connected for communication purposes to one or more automation devices. The connection may or will be set up, for example, by a device, referred to below as the interface device. The interface device may be a MindConnect Nano from Siemens, for example. In such cases, one or more of the automation devices may be connected to the interface device. The interface device may thus serve to accept data via one or more protocols and makes it possible to transfer this data to the cloud. The interface device in this case may support the transfer of encrypted data via a secure Internet connection in order to make cloud-based applications and services possible. To establish a connection for communication with the cloud (e.g., with at least one device in the cloud), an edge device functioning as an interface between the respective interface device and the cloud is used. Such an edge device has corresponding functionality for the purposes of the connection to the cloud (e.g., in the widest sense, has a wireless or wired Internet access and software functionality for using usual Internet protocols, such as HTTP and/or HTTPS).

One or more automation devices in such cases may be connected to the interface device for the purposes of communication via a bus system, such as a field bus, for example. The field bus may involve an industrial Ethernet (e.g., Profinet, HART, or Profibus). The interface device may thus receive a volume of data from the automation device. The interface device may thus, as described, receive a volume of data provided for transfer. This volume of data may, for example, contain all data transferred from one or more automation devices to the interface device. In one embodiment, only the data selected for the transfer based on the model will be transferred from the interface device to the data management means.

Thus, an existing system, such as an automation plant, may be upgraded by the interface device of the present embodiments without the automation devices themselves containing a corresponding model for selection of data to be transferred. Thus, the connection for communication in an automation plant (e.g., between the automation devices and a control unit for controlling a process running in the plant) may carry on as normal, but only the data selected based on the model will be transferred from the interface device to the data management device during this process. The individual automation devices of the automation plant thus do not have to have the data model available to them and select data for transfer. This function is carried out by the interface device. Otherwise, a selection of data provided for transfer by an individual automation device would not be possible or would only be possible with difficulty, since usually all data transferred from an automation device, such as, for example, position values, temperature values, etc. is used for control using a control unit, for example (e.g., a Programmable Logic Controller (PLC) of a process running in the plant). In such cases, the interface device may be installed on site (e.g., in the automation plant).

The one or more automation devices may involve one or more sensors, one or more actuators, and/or one or more process-related components. In one embodiment, the interface device thus has one model for each automation device (e.g., for each sensor operating according to the same measurement principle). Data of a number or sensors or other automation devices of the same type may thus be processed or selected based on a single model. The interface device may further include a number of models for selection of data to be transferred when automation devices of different types are present in the system, for example.

In one embodiment, the device transfers the modeling data at least in part to the data management means. In one embodiment, the model may be determined by the data management means.

In one embodiment, the model is determined based on the modeling data transferred to the data management means.

The formulation that the model is determined "using modeling data present in the device" may thus be interpreted as the model being determined at least based on at least a part of the modeling data present in the device. This provides that, to determine the model, not all the modeling data present in the device has to be included. In one embodiment, at least a part of the modeling data present in the device is included for determining the model. Further data may be included as well for determining the model.

In one embodiment, the model is a mathematical model. The model may further be a current model. The model may be determined by a regression method, for example. The current model may further be determined by machine learning. For example, the current model may be determined by means of deep learning (e.g., by using a neural network). The current model may further be determined by shallow learning, by using a support vector machine.

In one embodiment, the device transfers the modeling data to the data management means at least partly in a first, earlier transfer step. In one embodiment, the model is determined at least based on the modeling data transferred in the first, earlier transfer step.

In one embodiment, in a second transfer step later in time, using the model from the data volume provided for a transfer, the data that is actually to be transferred to the data management means may be selected, and the device may transfer the selected data to the data management means.

To transfer the modeling data, to select the data that is actually to be transferred to the data management means and/or to transfer the selected data, a switching unit may be provided in the device.

The second transfer step later in time may follow on from the first, earlier transfer step after an interval. In one embodiment, the second transfer step later in time may follow the first, earlier transfer step directly (e.g., without any time interval).

The modeling data may already have been obtained before the first transfer step. The data volume provided for a transfer may also have been obtained even before the first transfer step. The modeling data may include at least a part of the first-mentioned data volume provided for a transfer, for example. In other words, the data to be transferred in the second transfer step later in time and the modeling data may be selected from one and the same database.

In one embodiment, the modeling data is obtained within the first, earlier transfer step. In one embodiment, the volume of data provided for a transfer is obtained within the second transfer step later in time. In one embodiment, the modeling data includes at least a part of a volume of data other than the first-mentioned volume of data provided for a transfer.

When data of any given type is obtained, then the present embodiments provide that the data is established, determined, measured, read out, and/or read in.

In the first, earlier transfer step, all modeling data may be transferred to the data management means.

In one embodiment, in the first, earlier transfer step, modeling data that is to be transferred to the data management means is selected from the modeling data using an earlier model. Further, in the first, earlier transfer step, for example, the device may transfer the selected modeling data to the data management means. The first-mentioned model may be determined at least based on the transferred modeling data. This provides that the earlier model may be updated when the first-mentioned model is determined. In one embodiment, the earlier model is replaced/updated by the first-mentioned model.

If a few items of modeling data are not transferred in the first, earlier transfer step, the earlier model may be included for determining the first-mentioned model. This provides that the first-mentioned model may be determined on based the transferred modeling values and based on the earlier model.

If a few items of modeling data are not transferred in the first, earlier transfer step, required data for the modeling data not transferred in the first, earlier transfer step may be determined based on the earlier model. This required data sensibly lies within the earlier model. If the earlier model includes an earlier mathematical function, the required data may lie at the earlier mathematical function, for example. This required data may be included for determining the first-mentioned model. This provides that the first-mentioned model may be determined based on the transferred modeling values and based on the required data.

In one embodiment, the earlier model used in the first, earlier transfer step is an earlier mathematical model.

The earlier model used in the first, earlier transfer step may or will be predetermined. For example, the earlier model used in the first, earlier transfer step may be predetermined by the data management means. In principle, it is also possible for the earlier model used in the first, earlier transfer step to be predetermined by the device.

For example, the earlier model may be predetermined initially and/or predetermined by a user. The earlier model may further have been determined.

In one embodiment, the first-mentioned model is similar to the earlier model. In one embodiment, the first-mentioned model maps the modeling data better than the earlier model.

The first-mentioned model may include a mathematical function. The first-mentioned model may further include a tolerance range. In one embodiment, the tolerance range lies around the mathematical function. The tolerance range may be predetermined explicitly or implicitly. For example, the tolerance range may be dependent on the modeling data and/or on the model. For example, the tolerance range may be a predetermined multiple of a standard deviation of the function. The multiple may be any given real number (e.g., it does not have to involve an integer multiple). The tolerance range may further be a percentage figure that determines how much modeling data lies within the tolerance range.

In one embodiment, especially in the second, later transfer step, the data that lies within the tolerance range is not selected and thus not transferred to the data management means. In one embodiment, especially in the second, later transfer step, the data that lies outside the tolerance range is selected and thus transferred to the data management means.

The method and/or variations of the method may be repeated.

In one embodiment, using the data transferred in the second transfer step, an updated model is determined. In a third transfer step, which lies after the second transfer step in time, using the updated model, the data from a volume of data provided for a transfer that is actually to be transferred to the data management means may be selected, and the device may transfer the selected data to the data management means.

The volume of data provided for transfer in the third transfer step may be the same as the volume of data provided in the second transfer step.

In one embodiment, the volume of data provided for transfer in the third transfer step differs from the volume of data provided in the second transfer step. For example the volume of data provided for transfer in the third transfer step may be obtained within the third transfer step.

It is possible for the updated model to be determined using the same modeling data as the first-mentioned model. This is then possible if the modeling data and the volume of data provided for a transfer have the same database. The modeling data and the volume of data provided for a transfer expediently differ.

The volume of data provided in the second transfer step for a transfer may form updated modeling data. Using the data transferred in the second transfer step, an updated model that may describe the updated modeling data may be determined.

In the determination of the updated model, the first-mentioned model may be updated. In one embodiment, the first-mentioned model is replaced/updated by the updated model.

In one embodiment, the method is repeated a number of times, so that the first-mentioned model is updated a number of times.

The first-mentioned model may be determined and/or updated at a predetermined point in time. For example, the first-mentioned model may be determined and/or updated at an explicitly predetermined point in time (e.g., at a predetermined time of day or after a predetermined period of time (e.g., after 5 minutes, after 1 hour, or after 12 hours). The first-mentioned model may further be determined and/or updated at an implicitly predetermined point in time. For example, the first-mentioned model may then be determined and/or updated when a predetermined amount of data has been transferred to the data management means (e.g., overall or within a predetermined period of time). The first-mentioned model may further be determined and/or updated when the data transferred to the data management means has specific features (e.g., a specific pattern).

The volume of data provided for a transfer may include time-dependent data. The volume of data provided for a transfer may further include location-dependent data. The volume of data provided for a transfer may further include multi-dimensional data.

The present embodiments and/or developments of the present embodiments may be realized as software and/or as hardware (e.g., by using a specific electrical circuit).

A realization of the present embodiments and/or of a development of the present embodiments described is possible, at least partly, and also in its entirety, by a computer-readable storage medium, on which a computer program with commands is stored. The commands, when the commands are executed on a computer, cause the computer to carry out the present embodiments or the development.

The present embodiments further relate to a switching unit for transferring data from a device to a data management means. In accordance with the present embodiments, the switching unit is configured, by using a model that is determined using modeling data present in the device, and which describes the modeling data, to select from a volume of data provided for a transfer the data that is actually to be transferred to the data management means. The switching unit may further be configured to transfer the selected data to the data management means.

The switching unit may be realized as software and/or hardware (e.g., by using a specific electrical circuit). The switching unit may be a gateway, for example.

In one embodiment, the switching unit is a part of the device.

The switching unit of the present embodiments may be employed to carry out the previously mentioned method.

In one embodiment, the model is determined by the data management means. The advantage when the model is determined by the data management means lies in there usually being sufficient processing power or processing capacity present in the data management means for determining the model. The switching unit may further be kept quite lean in this way. This provides that processing power or processing capacity for determining the model does not have to be provided in the switching unit.

The present embodiments further relate to a device with a switching unit for transferring data to a data management means. The last-mentioned switching unit may be the switching unit previously mentioned.

In accordance with the present embodiments, the last-mentioned switching unit is configured, using a model that is determined using modeling data present in the device and that describes the modeling data, to select from a volume of data provided for a transfer of the data that is actually to be transferred to the data management means. The device is further configured to transfer the selected data to the data management means. For example, the switching unit may be configured to transfer the selected data to the data management means.

The present embodiments are further directed to a system including a data management means and the device of the present embodiments.

The data management means is configured in accordance with the present embodiments, using modeling data present in the device, to determine a model that describes the modeling data.

In accordance with the present embodiments, the device has a switching unit that is configured, using the model, to select from a volume of data provided for a transfer the data that is actually to be transferred to the data management means.

The device (e.g., the switching unit of the device) is further configured to transfer the selected data to the data management means.

The system may be employed to carry out the method previously described. For example, the elements of the system may be the elements stated in conjunction with the method.

The description of advantageous embodiments of the invention given previously contains numerous features, which in some cases are reproduced in the individual dependent claims grouped together in multiples. These features may, however, also be considered on their own and grouped together into further sensible combinations. For example, these features are able to be combined individually and in any given suitable combination with the method and the switching unit, the device, and/or the system of the present embodiments. In this way, the method features are also to be seen as a characteristic of the switching unit, the device, and/or the system formulated in figurative terms and vice versa.

Even if the few terms used in the description and in the claims are used in the singular or in conjunction with a numeral in each case, the scope of the invention is not intended to restrict these terms to the singular or to the respective numeral.

The characteristics, features, and advantages of this invention and also the manner in which these are achieved will become clearer and easier to understand in conjunction with the description of the exemplary embodiments given below, which are explained in greater detail in conjunction with the drawings. The exemplary embodiments serve to explain the invention and do not restrict the invention to the combination of features specified therein, not even in relation to functional features. Further, features of each exemplary embodiment suitable for the purpose may also be considered explicitly in isolation, removed from an exemplary embodiment, inserted into another exemplary embodiment to supplement it, and be combined with any given one of the claims.

DETAILED DESCRIPTION

Figure 1:
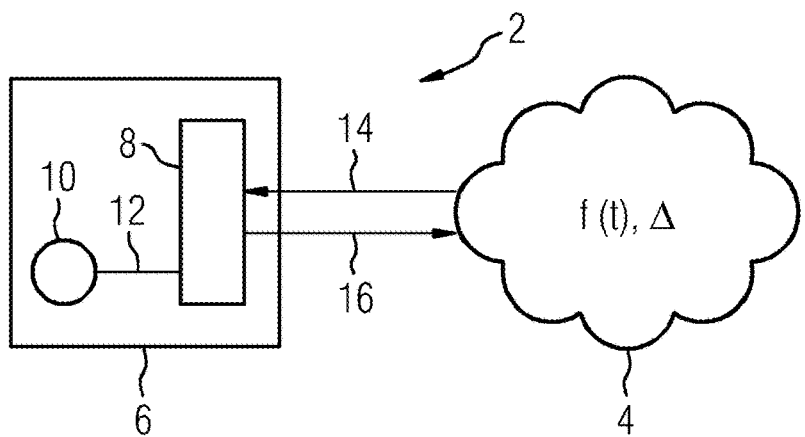
FIG. 1 shows a system including a data management means and a device with a switching unit.

FIG. 1 shows a system 2 with a data management means 4 and a device 6. The device 6 includes a switching unit 8. The device 6 also includes at least one sensor 10. The at least one sensor 10 is connected to the switching unit 8 via a data connection 12.

A number of items of data (cf. FIG. 2) are obtained in the device 6. For example, the data is measured in the device 6 by the sensor 10. The data is time-dependent measured values of the sensor 10, for example.

In the present example, the data obtained corresponds to a volume of data provided for a transfer.

The obtained data, which forms the volume of data provided for the transfer, is transferred to the data management means 4 in part in three transfer stages.

Figure 2:
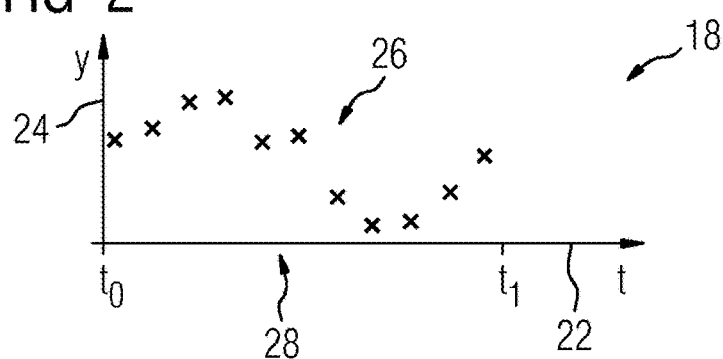
FIG. 2 shows a time-dependent sequence of data with a first function.
Figure 3:
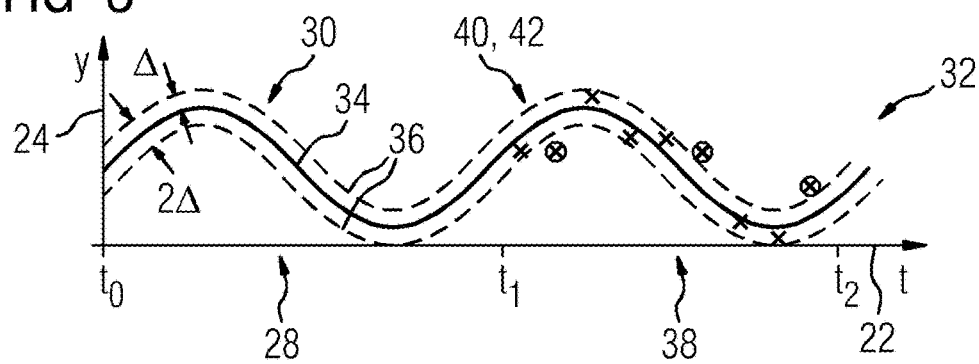
FIG. 3 shows a function from FIG. 2 updated based on the time-dependent sequence of data.
Figure 4:
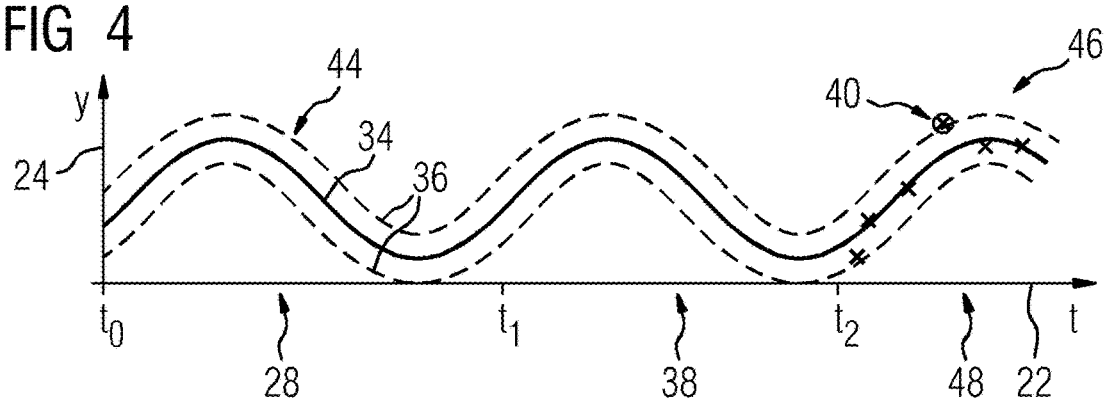
FIG. 4 shows a function from FIG. 3 updated based on updated modeling data.

The three transfer stages are shown in FIG. 2 to FIG. 4.

FIG. 2 shows a diagram 18. A time t is plotted on the x axis 22 of the diagram. Any given parameter y may be plotted on the y axis 24 of the diagram 18. In this example, the time-dependent measurement value of the sensor 10 is plotted on the y axis 24.

Shown by way of example in FIG. 2 as crosses is modeling data 26. The modeling data 26 has been obtained in the device within a first transfer step 28, which extends from $t_0$ to $t_1$. The modeling data has been obtained in the device in this example within the first transfer step 28.

In this example, all of the modeling data 26 is transferred to the data management means 4. It would also be possible for only a part of the modeling data 26 to be transferred to the data management means 4. The arrow 16 depicted in FIG. 1 illustrates (inter alia) the—at least partial—transfer of the modeling data 26 from the device 6 to the data management means 4.

The data management means 4 determines a first model 30 based on the transferred modeling data 26. The first model 30 is shown by way of example in FIG. 3.

FIG. 3 shows a diagram 32. The description given below is essentially restricted to differences from the diagram depicted in FIG. 2, which is to be referred to as regards features that remain the same. Features that essentially remain the same are basically labeled with the same reference numbers, and features not mentioned are adopted into the embodiment given below without being described once again.

The first model 30, which was determined based on the modeling data 26 from FIG. 2, is entered in the diagram 32. In this example, the first model 30 has a mathematical function f(t) that is shown in the drawing as a solid line 34. The model further has a tolerance range. The tolerance range lies around the mathematical function f(t). In the drawing, the tolerance range is delimited by two dashed lines 36, so that the tolerance range is located between the two dashed lines 36 in FIG. 3.

The width of the tolerance range may be dependent on the function f(t). For example, the width of the tolerance range may be a predetermined multiple of a maximum value of the function f(t).

In this example, the width of the tolerance range is selected such that the shortest distance between each point on one of the dashed lines 36 to the function f(t) is equal to $\Delta$. The tolerance range may be selected in another way, however.

The first model 30 is transferred from the data management means 4 to the switching unit 8. The transfer of the first model 30 is shown in FIG. 1 by an arrow 14 from the data management means 4 to the switching unit 8.

Within the second transfer step 38, which is later in time than the first transfer step 28, further data is obtained. In this example, the second transfer step 38 follows on from the first transfer step 28. The second transfer step 38 lies between the predetermined start time $t_1$ and the predetermined end time $t_2$.

The data obtained in the second transfer step 38 represents a volume of data 40 provided for a transfer. The volume of data 40 provided for a transfer (e.g., the data obtained in the second transfer step 38) is shown as crosses in FIG. 2.

Using the first model 30, the data that is actually to be transferred to the data management means 4 is selected from the volume of data 40 provided for a transfer. The device 6, (e.g., the switching unit 8) transfers the selected data to the data management means 4. The transfer of the selected data from the device 6 (e.g., from the switching unit 8) to the data management means 4 is shown in FIG. 1 by an arrow 16.

The data management means 4 receives the transferred data and stores the transferred data.

The data that lies within the tolerance range 2Δ (e.g., here the data that lies in FIG. 3 between the two dashed lines 36) is not selected and is thus not transferred to the data management means 4.

The data that lies outside the tolerance range 2Δ is shown in in FIG. 3 as a cross surrounded by a circle. The data that lies outside the tolerance range 2Δ is selected and is thus transferred to the data management means 4.

The volume of data 40 provided for a transfer in the second transfer step 38 forms updated modeling data 42. Using the data transferred in the second transfer step 38, the data management means 4 determines an updated model 44. The updated model 44 describes the updated modeling data 42. The updated model 44 is shown in FIG. 4.

In this example, the updated model 44 has an updated function $f_a(t)$.

For example, the updated model 44 has been determined at least based on the data transferred in the second transfer step.

Only a part of the volume of data 40 provided for a transfer has been transferred to the data management means 4.

The updated model 44 may (additionally) be determined using the earlier, first model 30. This provides that, to determine the updated function $f_a(t)$, the previous function f(t) is also included.

To determine the updated function $f_a(t)$, a predetermined data rate may further be included. The data rate corresponds to the amount of data per unit of time. This provides that the gap between two items of data corresponds to the inverse of the data rate. For example, the data rate may be predetermined by a controller of the device 6 and/or by the sensor 10. The data rate may be transferred to the data management means 4, entered into the data management means 4, and/or determined by the data management means 4 (e.g., based on the transferred data).

Required data for non-transferred data is computed from the previous function f(t) and also from the predetermined data rate. The respective time value for which the non-transferred data is obtained may be determined based on the data rate, for example. The required data may include the function value f(t) for the respective time value and the respective time value, for example.

This required data for non-transferred data is likewise included for updating of the function. The updated function $f_a(t)$ is determined based on the data transferred in the second transfer step 38 and the required values for non-transferred data.

FIG. 4 shows a diagram 46. The description given below is essentially restricted to the differences from the diagram depicted in FIG. 3, which is referred to as regards features that remain the same. Features that essentially remain the same are basically labeled with the same reference numbers, and features not mentioned are adopted into the exemplary embodiment given below without being described once again.

Entered in the diagram 46 is the updated model 44 that was determined using the volume of data 40 provided for a transfer in the second transfer step, which corresponds to the updated modeling data 42.

In this example, the updated model 44 has an updated function $f_a(t)$, that is shown in the drawing as a solid line 34. The model further has a tolerance range, updated if necessary. The tolerance range (e.g., updated if necessary) lies around the mathematical function $f_a(t)$. In the drawing, the tolerance range (e.g., updated if necessary) is delimited by two dashed lines 36, so that the tolerance range (e.g., updated if necessary) is located between the two dashed lines 36 in FIG. 4.

A third transfer step 48 lies at a time after the second transfer step 38. The third transfer step 48, for example, follows on directly from the second transfer step 38 and begins at start time $t_2$.

In the third transfer step 48, further data is obtained in the device 6. The data obtained in the third transfer step 48 represents a volume of data 40 provided for a transfer. The volume of data 40 provided for a transfer (e.g., the data obtained in the second transfer step 38) is shown in FIG. 4 as crosses.

In the third transfer step 48, using the updated model 44 from the volume of data 40 provided for a transfer, the data that is actually to be transferred to the data management means 4 is selected, and the device transfers the selected data to the data management means 4. The selection in the third transfer step 48 is made in a similar way to the selection in the second transfer step 38 (cf. FIG. 3).

Based on the data transferred in the third transfer step 48, the updated model 44 may be updated.

As a result of the method described, the entire volume of data 40 provided for a transfer does not have to be transferred to the data management means 4. By selecting the data actually to be transferred to the data management means 4, the amount of data transferred, and thus the volume of data transferred, may be reduced. For example, the amount of data transferred, and thus, for example, the volume of data transferred, may be reduced by at least 50% or by at least 80%.

Although the invention has been illustrated and described in greater detail by the preferred exemplary embodiments, the invention is not restricted by the disclosed examples and other variations can be derived herefrom by the person skilled in the art without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for data interchange between a device in an automation plant and a data manager, the method comprising:
    receiving, by the device, modeling data from a number of automation devices connected to the device, wherein the device comprises a gateway, the gateway being separate from the data manager;
    transferring, by the gateway of the device, the modeling data to the data manager, wherein the data manager is a cloud, an Internet of Things service, or the cloud and the Internet of Things service;

determining, by the data manager using the modeling data, a model that describes the modeling data;

transferring, by the data manager, the model that describes the modeling data to the device;

receiving, by the gateway of the device, a volume of data from the number of automation devices connected to the device, the volume of data provided for a further transfer to the data manager, wherein the volume of data is useable to control a process running in the automation plant using a controller, wherein the volume of data contains all data transmitted from the number of automation devices to the device;

selecting, by the gateway of the device, a subset of data from the volume of data based on the model; and transferring, by the gateway of the device, the selected subset of the data to the data manager.

2. The method of claim 1, further comprising:

selecting, by the gateway of the device using an earlier model, a subset of modeling data from the modeling data; and transferring, by the gateway of the device, the selected modeling data to the data manager, wherein the model is determined based on the transferred subset of modeling data.

3. The method of claim 2, wherein the model is predetermined.

4. The method of claim 2, further comprising:

determining, by the gateway of the device, a further subset of the modeling data not present in the subset of the modelling data transferred to the data manager based on the model when a number of items of the modeling data are not included in the subset of the modelling data transferred to the data manager, wherein the model is determined based on the further subset of the modelling data.

5. The method of claim 1, further comprising:

determining, by the data manager, an updated model using the subset of the data from the volume of data transferred to the data manager, selecting, by the gateway of the device, a further subset of the data from the volume of data using the updated model; and transferring, by the device, the selected further subset of the data from the volume of data.

6. The method of claim 1, wherein the selected subset of data from the volume of data forms updated modeling data; and wherein the method further comprises:

determining, by the data manager using the updated modeling data, an updated model that describes the updated modeling data.

7. The method of claim 1, wherein the model comprises a mathematical function and a tolerance range, wherein function values of the mathematical function lie within the tolerance range, and wherein data that lies within the tolerance range is not selected and is thus not transferred to the data manager.

8. The method of claim 1, wherein the model comprises a mathematical function and a tolerance range, wherein function values of the mathematical function lie within the tolerance range, and wherein data that lies outside the tolerance range is selected and is thus transferred to the data manager.

9. A system comprising:

a processor for transferring data from a device to a data manager, wherein the processor is part of a gateway;

an automation plant comprising a number of automation devices connected to the device, the processor being arranged in the automation plant; and a memory stored in the automation plant and in communication with the processor, wherein the memory stores instructions executable by the processor to:

receive a volume of data from the number of automation devices connected to the device, the volume of data provided for a transfer to the data manager, wherein the volume of data is operable to control a process running in the automation plant, and wherein the volume of data contains all data transmitted from the number of automation devices to the device;

select, using a model that is determined using modeling data present in the device and that describes the modeling data, a subset of data from the volume of data received from the number of automation devices; and transfer the subset of data to the data manager, wherein the processor is connected to the number of automation devices via a data connection, via which the data is provided, wherein the data manager is a cloud, an Internet of Things service, or the cloud and the Internet of Things service, and wherein the volume of data includes all data transferred from the number of automation devices to the device.

10. A switch unit for a system, the system comprising:

a processor configured for transferring data from a plurality of automation devices to a data manager, wherein the processor is part of a gateway;

an automation plant comprising the plurality of automation devices, the processor being arranged in the automation plant, wherein the processor is configured to:

receive a volume of data from the plurality of automation devices connected to the device, the volume of data provided for a transfer to the data manager, wherein the volume of data is operable to control a process running in the automation plant, wherein the volume of data contains all data transmitted from the plurality of automation devices to the device;

select, using a model that is determined using modeling data present in the plurality of automation devices and that describes the modeling data, a subset of data from the volume of data received from the plurality of automation devices; and transfer the subset of data to the data manager, wherein the processor is connected to the plurality of automation devices via a data connection, via which the data is provided, wherein the data manager is a cloud, an Internet of Things service, or the cloud and the Internet of Things service, and wherein the volume of data includes all data transferred from the plurality of automation devices to the device.

* * * * *